(12) United States Patent
Cleaves et al.

(10) Patent No.: US 11,814,015 B2
(45) Date of Patent: Nov. 14, 2023

(54) TRUCK SERVICE BODY

(71) Applicant: The Shyft Group, Inc., Charlotte, MI (US)

(72) Inventors: Bill Cleaves, Liberty, ME (US); Steve Mayo, South China, ME (US); James Rutter, Portland, ME (US); Jordan Brown, Sidney, ME (US)

(73) Assignee: The Shyft Group, Inc., Charlotte, MI (US)

( * ) Notice: Subject to any disclaimer, the term of this patent is extended or adjusted under 35 U.S.C. 154(b) by 113 days.

(21) Appl. No.: 17/198,399

(22) Filed: Mar. 11, 2021

(65) Prior Publication Data

US 2022/0289116 A1 Sep. 15, 2022

(51) Int. Cl.
*B60R 9/02* (2006.01)
*B60R 11/06* (2006.01)

(52) U.S. Cl.
CPC ............... *B60R 9/02* (2013.01); *B60R 11/06* (2013.01)

(58) Field of Classification Search
CPC ..... B60R 11/06; B60R 9/02; B60R 2011/004; B62D 33/023
USPC .............................................. 296/37.6, 183.1
See application file for complete search history.

(56) References Cited

U.S. PATENT DOCUMENTS

| | | |
|---|---|---|
| D103,460 S | 3/1937 | Larsen |
| D257,968 S | 1/1981 | Rice |
| 5,368,357 A * | 11/1994 | Kalis, Jr. ................... B60R 9/00 296/183.1 |
| 5,421,645 A | 6/1995 | Young |
| 5,615,922 A | 4/1997 | Blanchard |
| D432,489 S | 10/2000 | Hall |
| 6,174,012 B1 | 1/2001 | Saffold |
| 6,941,654 B1 * | 9/2005 | Sears ....................... B21D 5/00 296/37.6 |
| D520,926 S | 5/2006 | Boyer |
| 7,052,067 B2 | 5/2006 | Walker |
| 7,093,881 B2 | 8/2006 | Rusu |

(Continued)

FOREIGN PATENT DOCUMENTS

| | | |
|---|---|---|
| CA | 74798 | 2/1902 |
| CA | 89126 A | 9/1904 |

(Continued)

OTHER PUBLICATIONS

Machine Translation of CN 102935829.*

(Continued)

*Primary Examiner* — Dennis H Pedder
*Assistant Examiner* — Kevin P Weldon
(74) *Attorney, Agent, or Firm* — Barnes & Thornburg LLP

(57) ABSTRACT

A truck body with an enclosure assembly that has a plurality of storage compartments with doors each movable between an open position that provides access to respective storage compartments and a closed position that prevents access to that storage compartment. The enclosure assembly includes at least one hidden hinge coupled with at least a portion of the doors to pivot the door between the open/closed positions. There are door flanges surrounding the openings of the storage compartments that, in some embodiments, include: (i) a longitudinally-extending channel dimensioned to receive a mounting portion of the at least one hidden hinge; and (ii) a rim configured to receive a seal.

20 Claims, 19 Drawing Sheets

(56) References Cited

U.S. PATENT DOCUMENTS

| | | | |
|---|---|---|---|
| 8,231,163 | B1 | 7/2012 | Dawe |
| 11,305,823 | B2 * | 4/2022 | McKinney .............. B60R 13/01 |
| 2003/0214150 | A1 * | 11/2003 | van der Vegt ............ B60P 3/36 |
| | | | 296/156 |
| 2005/0134070 | A1 * | 6/2005 | Plentis ...................... B60R 9/02 |
| | | | 296/37.1 |
| 2008/0191506 | A1 | 8/2008 | Huotari |
| 2015/0375690 | A1 * | 12/2015 | Beasley .................. B60R 11/00 |
| | | | 296/37.6 |
| 2019/0275951 | A1 * | 9/2019 | Steele ....................... B60R 9/06 |
| 2021/0316670 | A1 * | 10/2021 | Harkins .................... B60R 9/02 |

FOREIGN PATENT DOCUMENTS

| | | | |
|---|---|---|---|
| CN | 102935829 A | * | 2/2013 |
| CN | 112009392 A | * | 12/2020 |
| WO | WO 1999/003719 A1 | | 1/1999 |

OTHER PUBLICATIONS

International Search Rerport & Written Opinion—dated Jul. 1, 2022; US2022/019687; Filed Mar. 10, 2022.
Peoria Ford Commercial Fleet. 2016 Ford F-250 Stahl Service Body Walkaround. 1, 5, 6, 8-14, 18-20; YouTube. Aug. 24, 2016. [retrieved on May 17, 2022). Retrieved from internet:<URL:https://www.youtube.com/watch?v=Vg_rPA5lr-.k>. entire video. See pp. 7-8 of ISA/237.
Ebay Listing—Brand FX Fiberglass Utility Service Bed 56" CTA Genrator Door Compressor Area; Dated: Mar. 15, 2021.

* cited by examiner

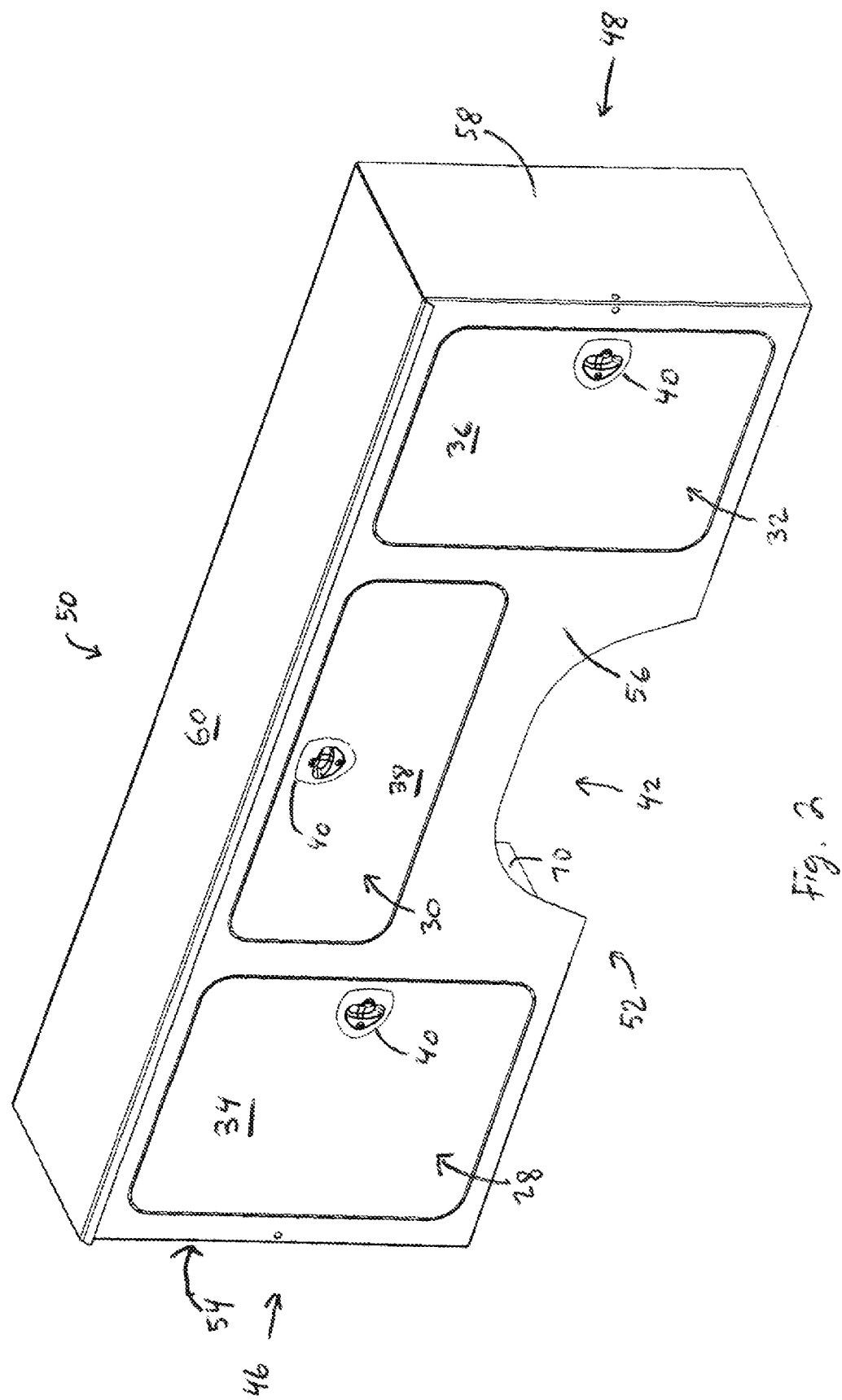

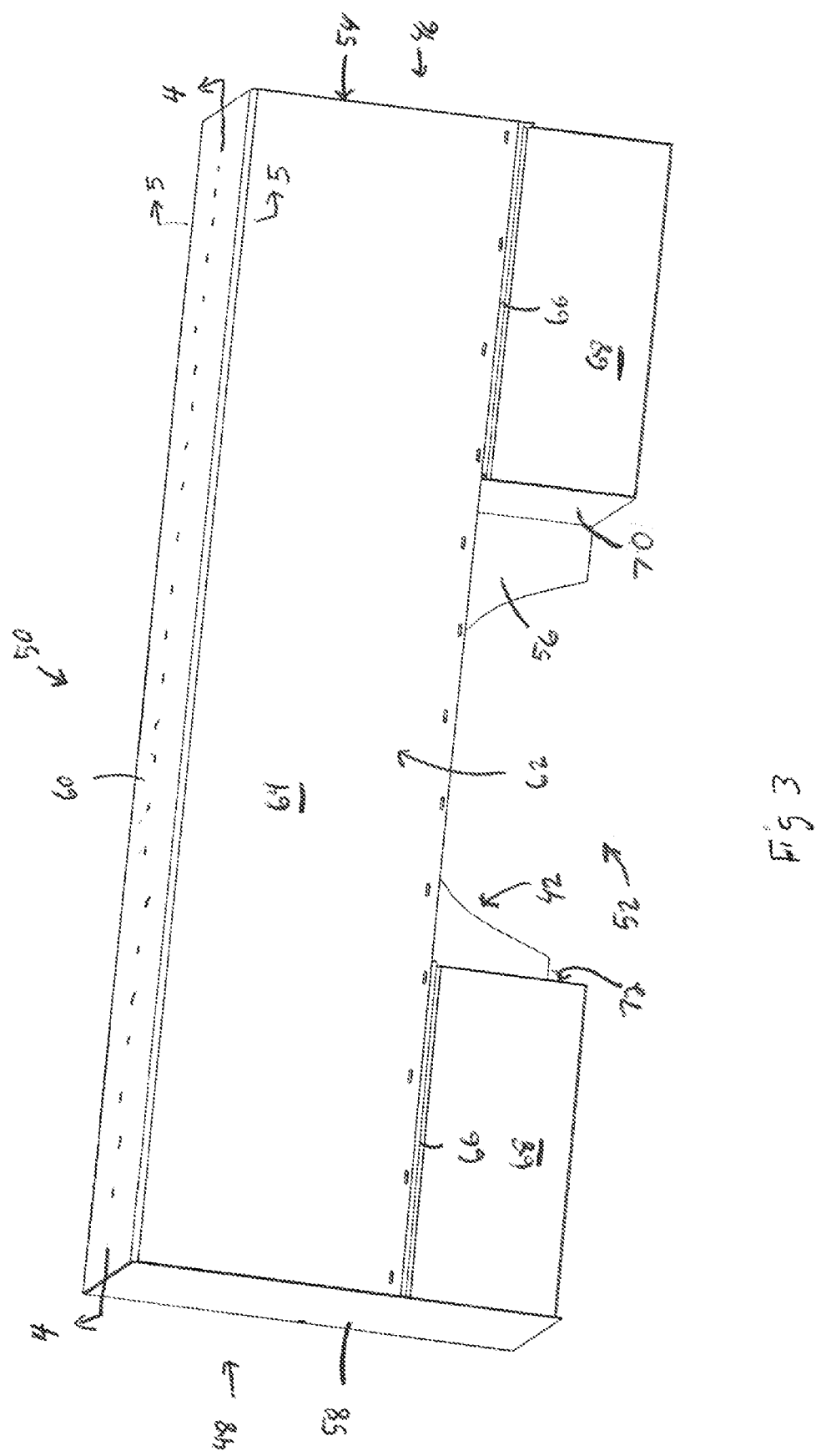

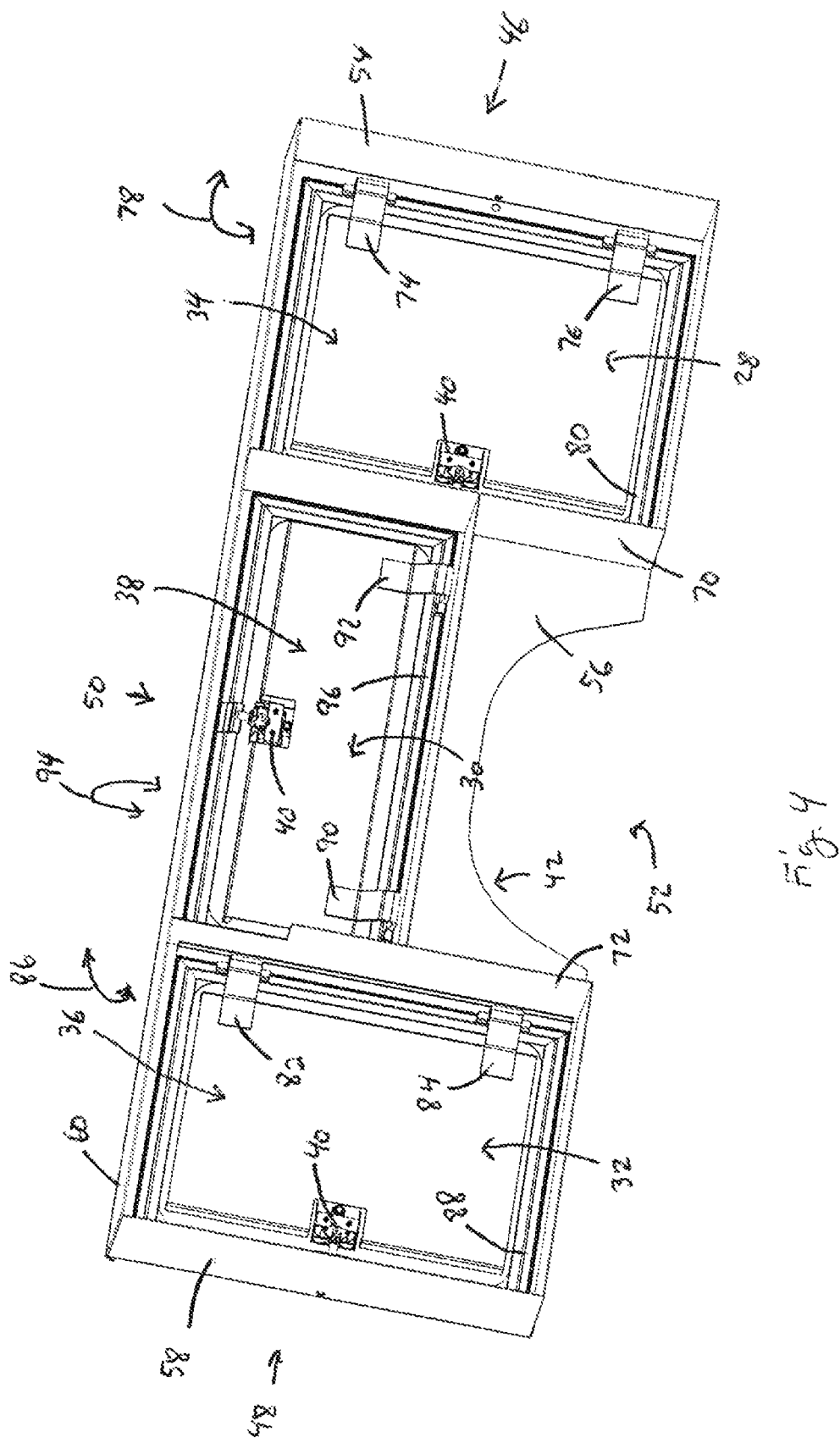

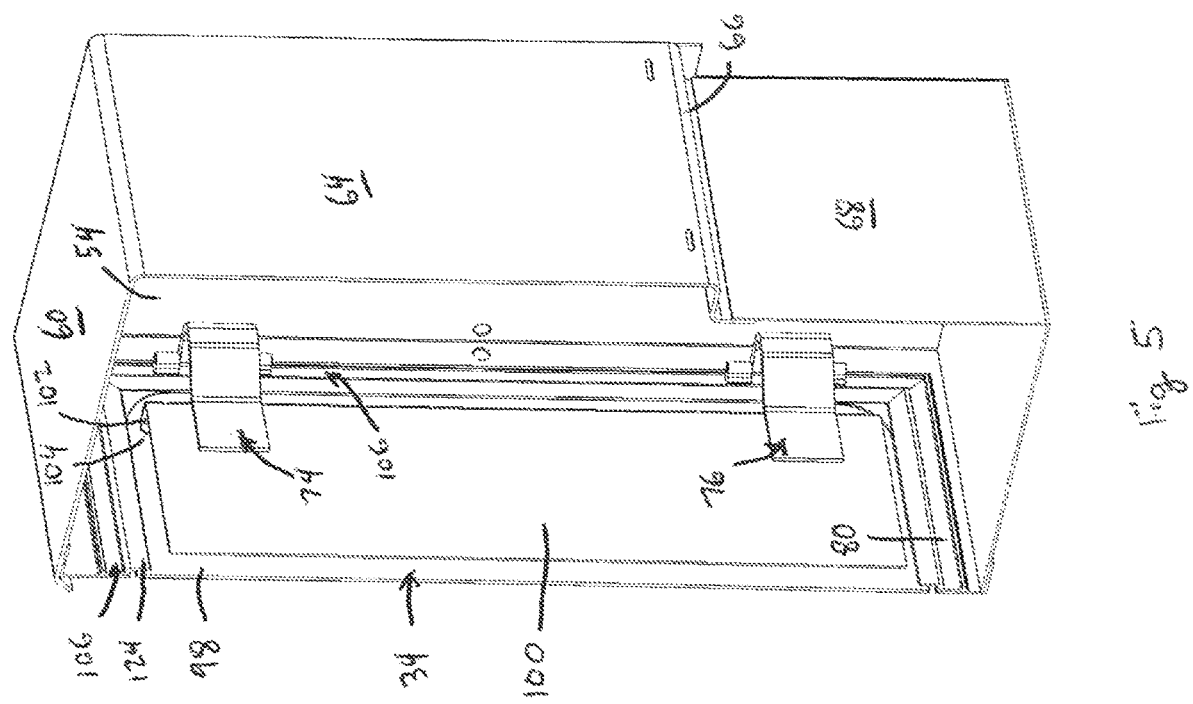

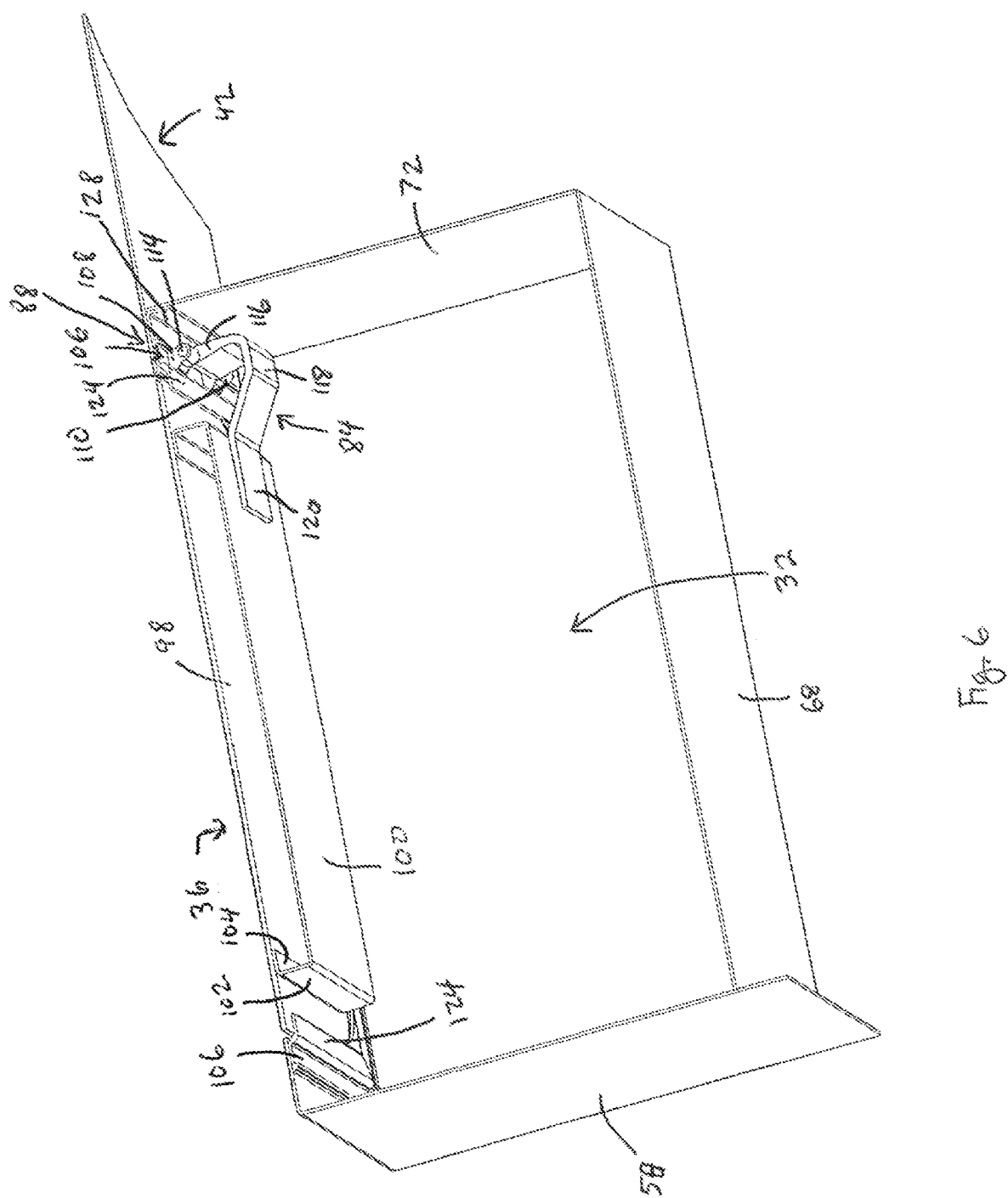

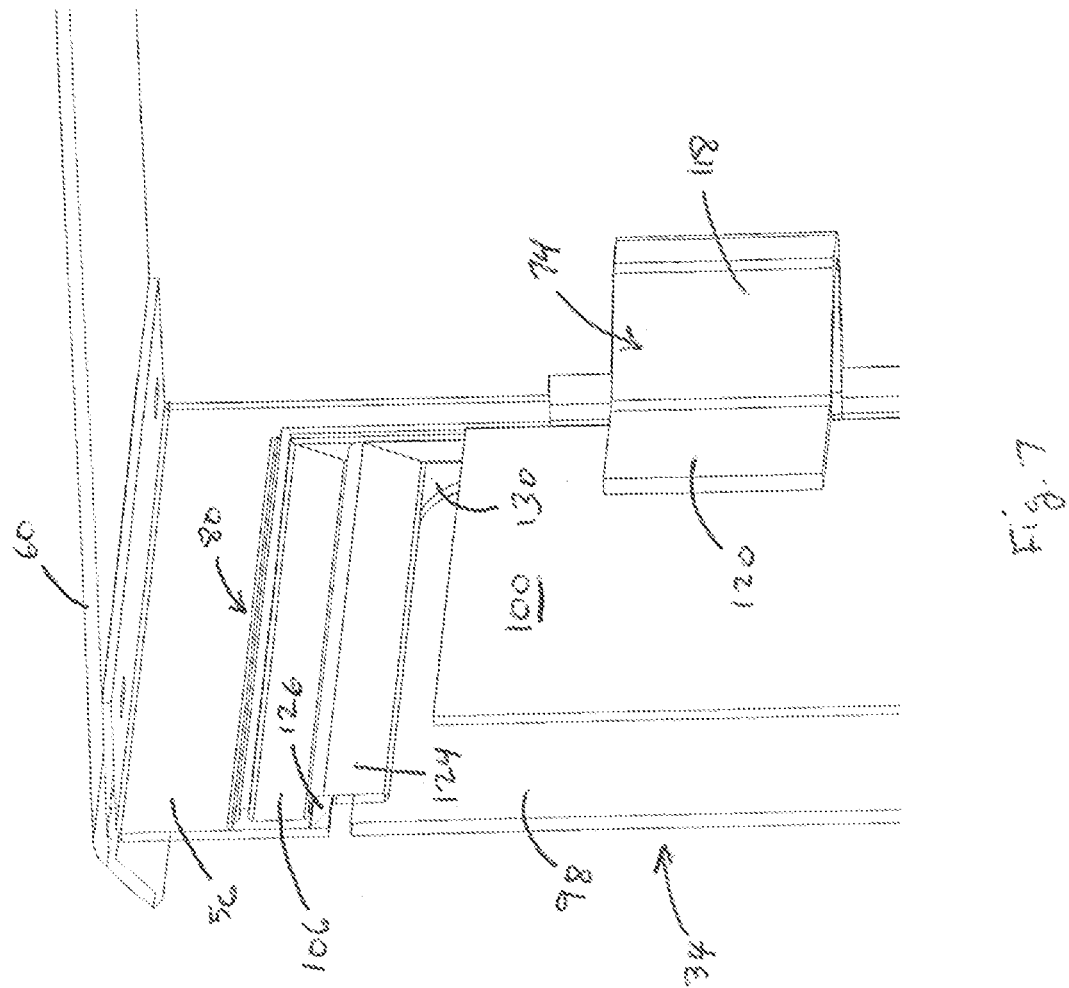

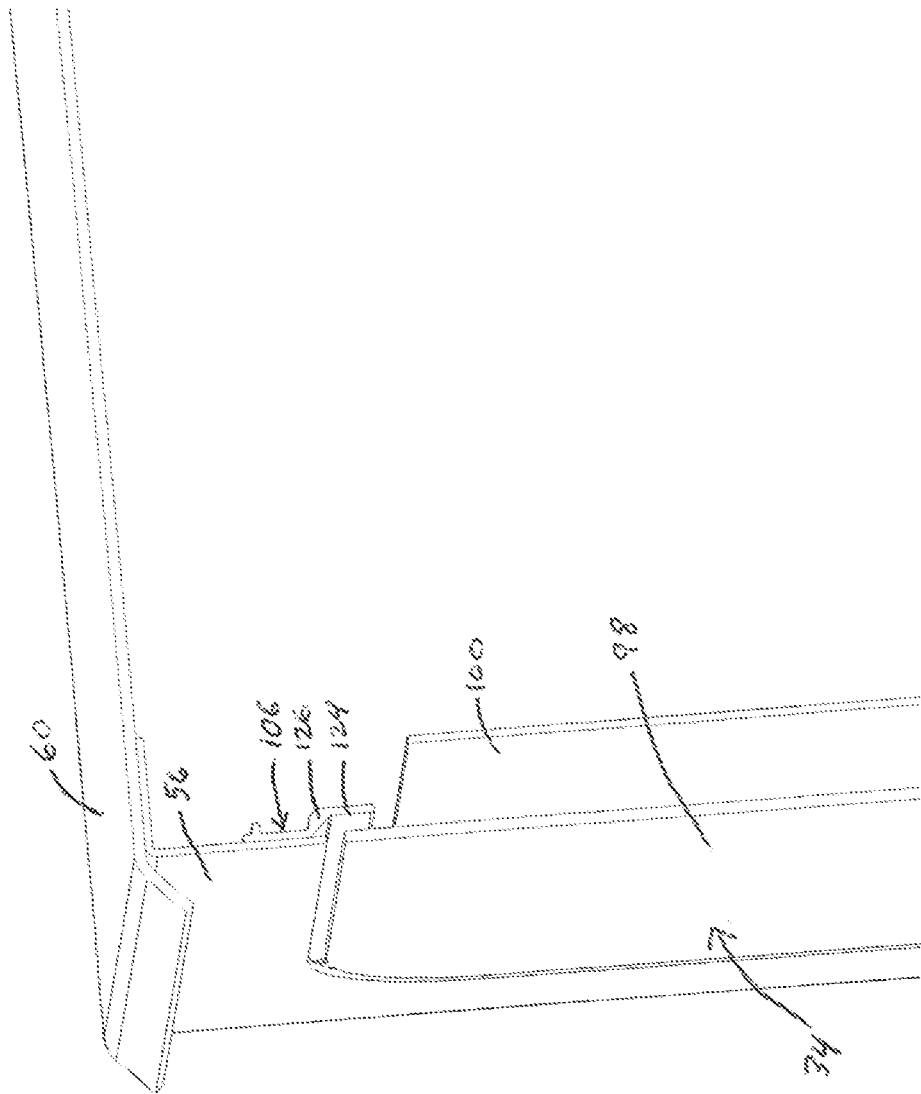

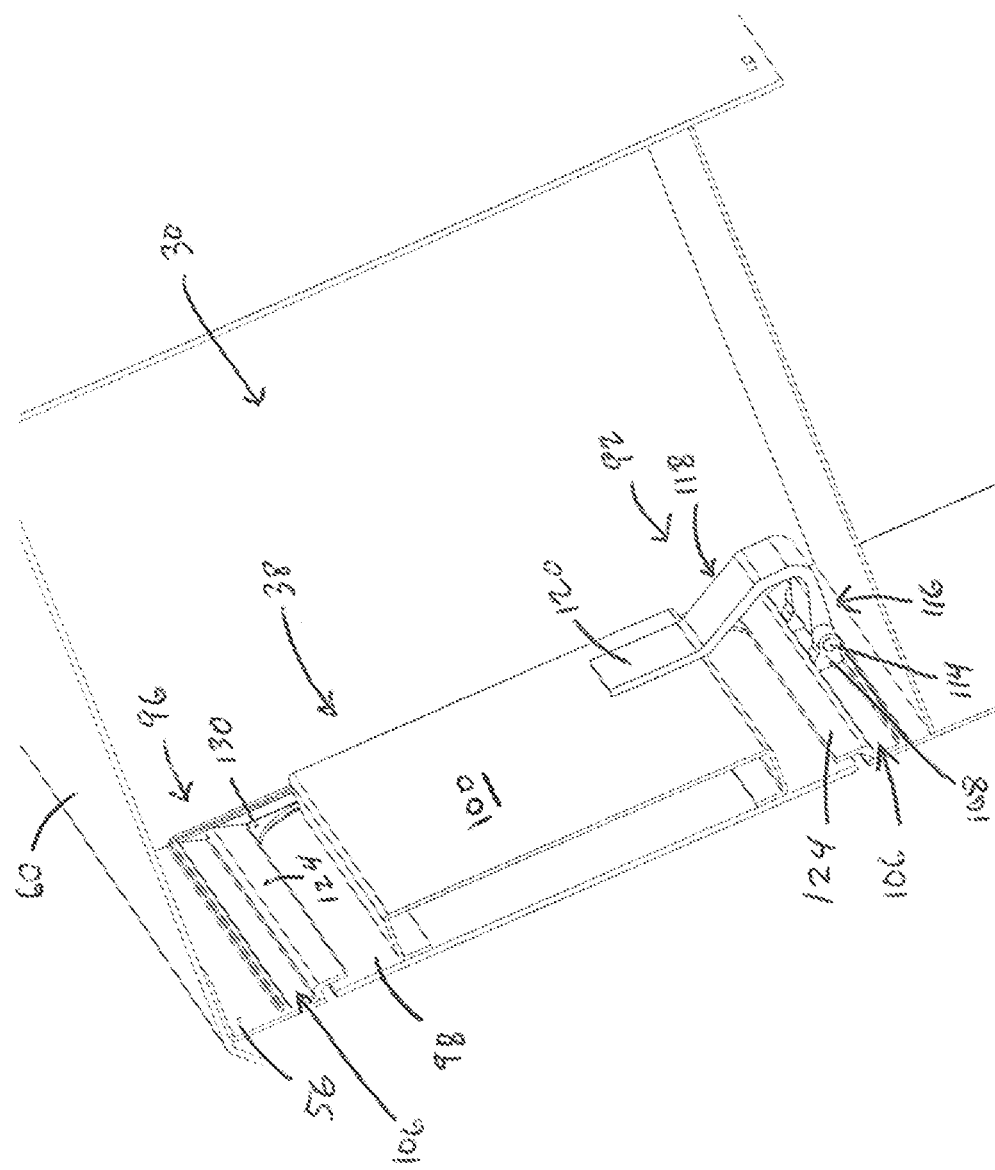

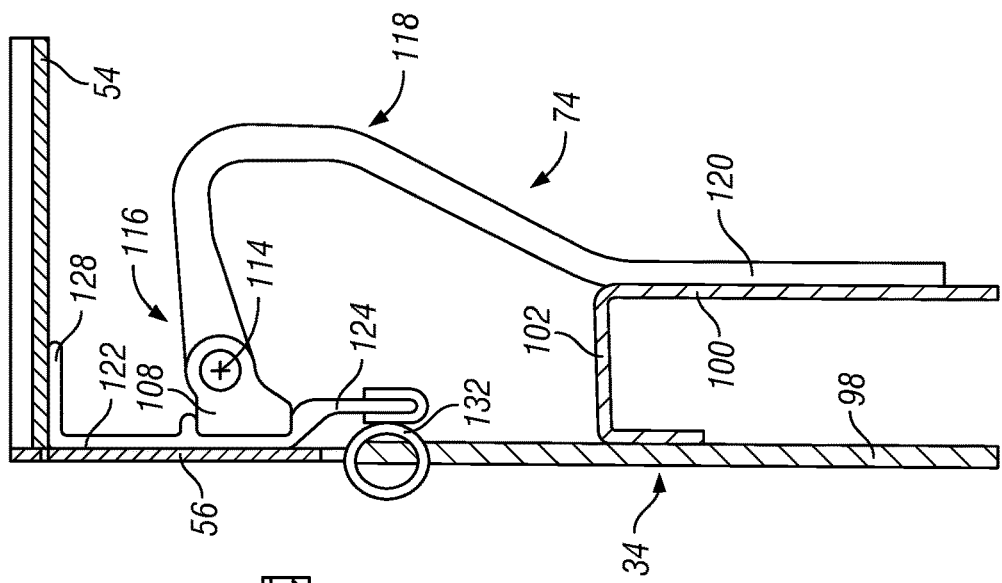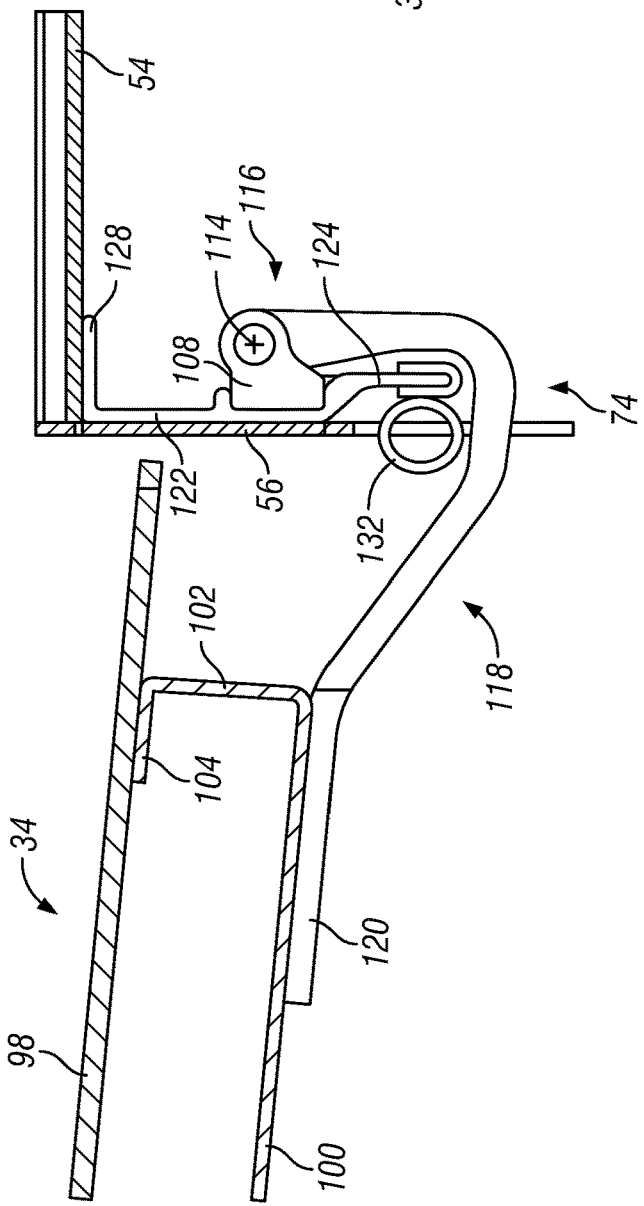

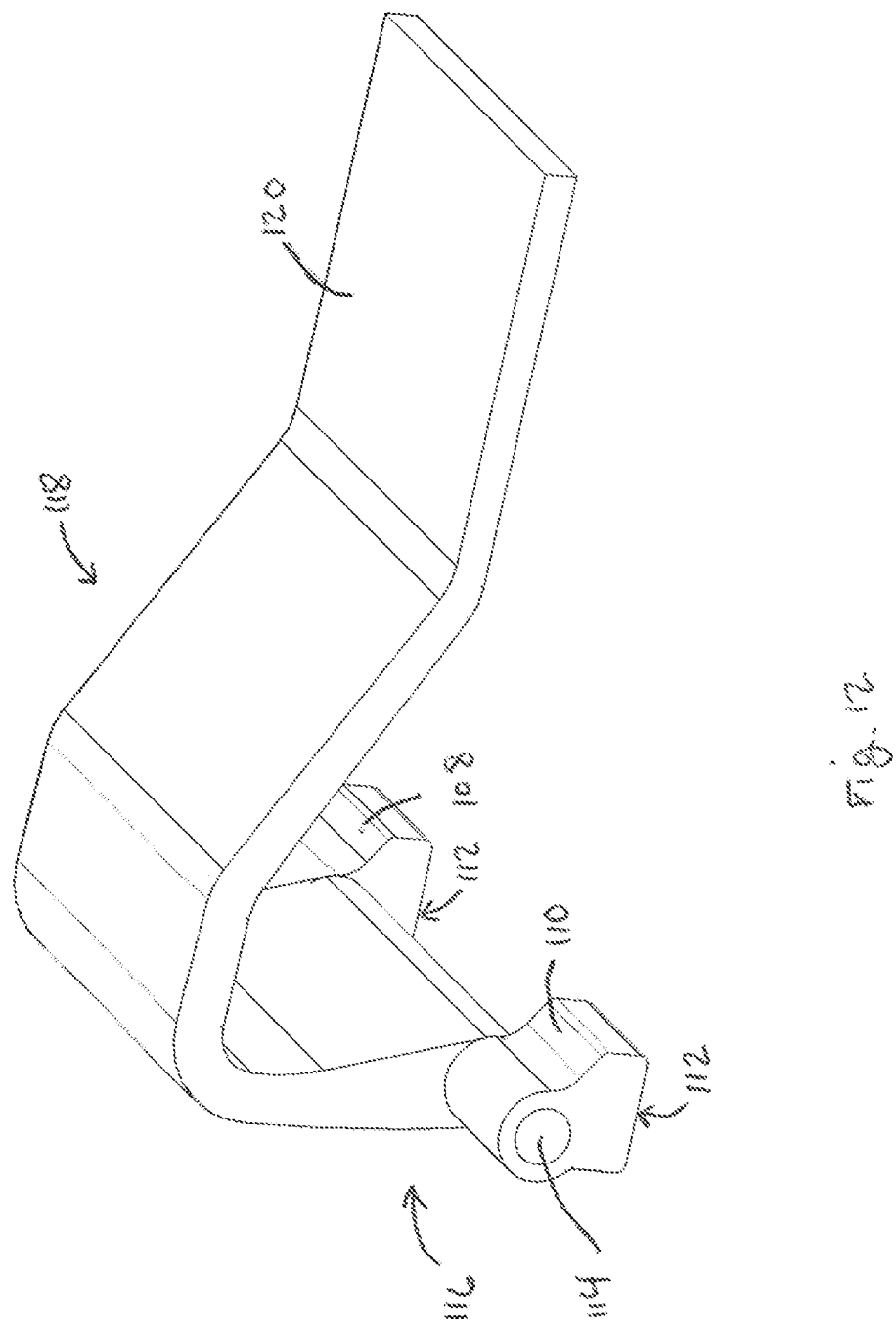

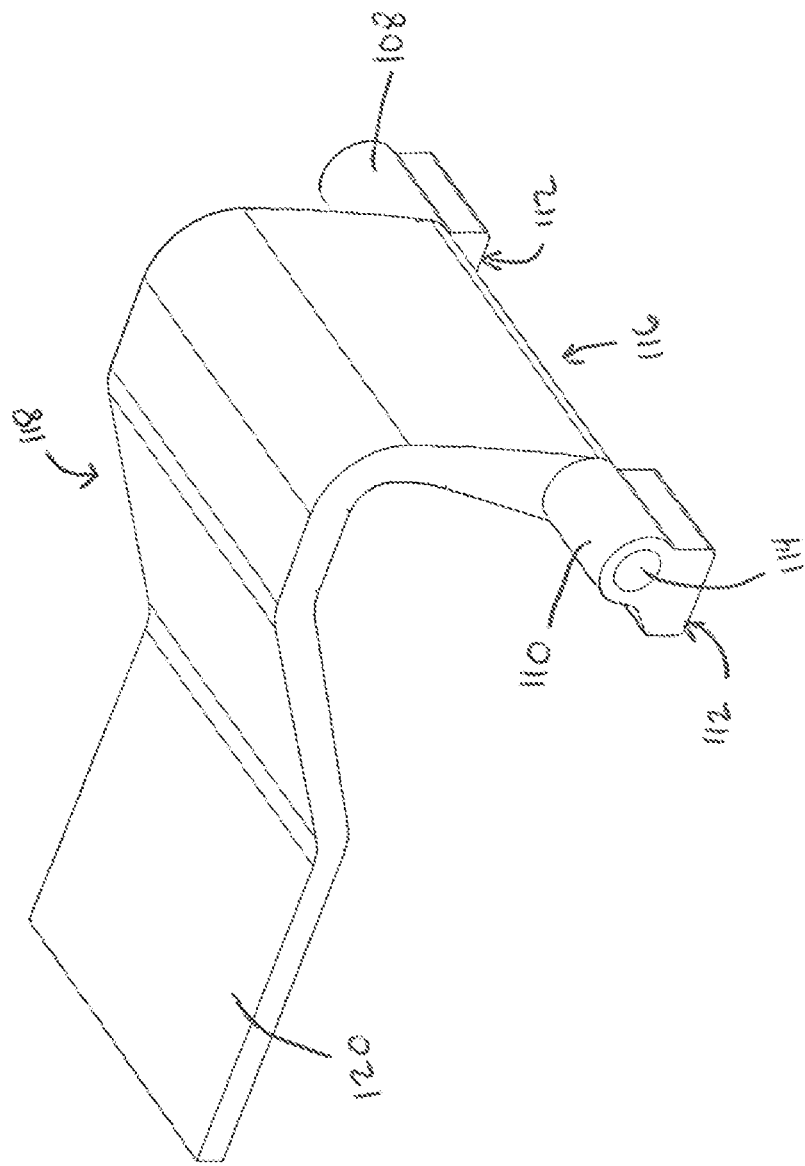

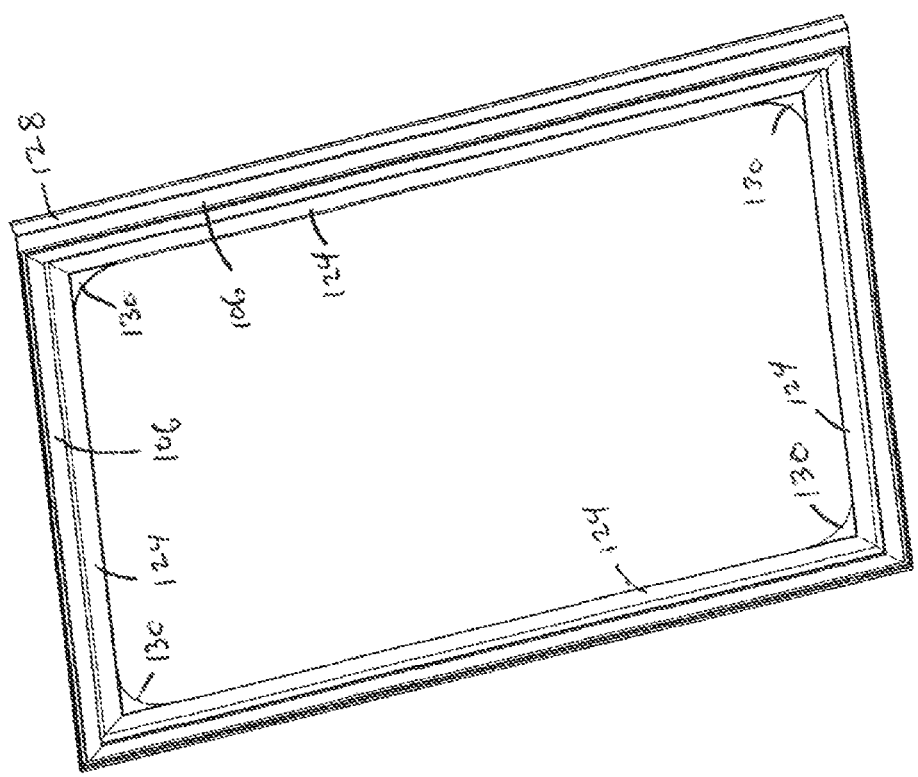

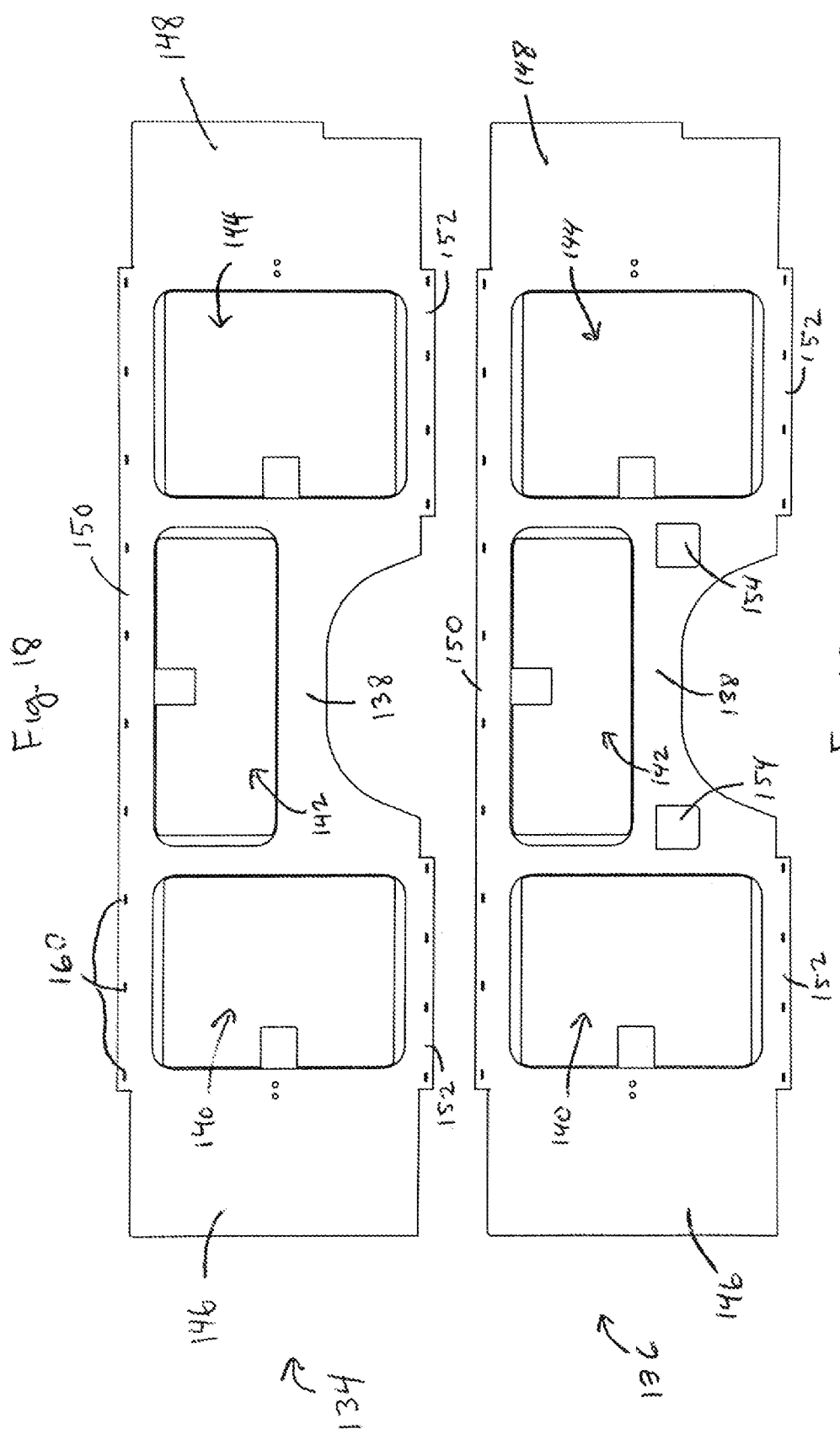

TRUCK SERVICE BODY

TECHNICAL FIELD

This disclosure relates generally to truck service bodies; in particular, this relates to a service body that may be manufactured more quickly and has improved water sealing.

BACKGROUND

Service body trucks can carry equipment, tools, parts, etc., needed for jobs, such as electrical, plumbing and general construction. Service bodies have storage compartments for tools and parts. One issue with existing service bodies can be sources of water leakage. For example, rivets are often used to install hinges and other components, but rivets punched through the walls of the enclosure can create areas through which water can leak into the storage compartments.

The manufacture of service bodies can also be time consuming. For example, many existing service bodies include several components that need to be welded together. This requires multiple processing steps, such as grinding, cleaning and priming the weld joints. These processing steps add complexity and cost to the manufacture of service bodies.

Although service bodies are generally acceptable for their purpose, there is a need for a service body that overcomes one or more of these obstacles.

SUMMARY

According to one aspect, this disclosure provides a truck body with a first side structure having a first enclosure assembly defining a plurality of storage compartments and a second side structure having a second enclosure assembly defining a plurality of storage compartments. The truck body includes a bed between the first side structure and the second side structure. The first enclosure assembly and/or the second enclosure assembly includes a plurality of doors each movable between an open position that provides access to a respective storage compartment of the plurality of storage compartments and a closed position that prevents access to the respective storage compartment. The enclosure assembly has at least one hidden hinge positioned within one or more of the storage compartments and coupled with a respective door of the plurality of doors to pivot the respective door between the open position and the closed position. There are a plurality of door flanges each surrounding an opening for a respective storage compartment of the plurality of storage compartments. In some cases, at least a portion of the plurality of door flanges include: (i) a longitudinally-extending channel dimensioned to receive a mounting portion of the at least one hidden hinge; and (ii) a rim configured to receive a seal.

According to another aspect, this disclosure provides an enclosure assembly for a truck service body. The enclosure assembly includes an enclosure assembly defining a plurality of storage compartments. There are a plurality of doors each movable between an open position that provides access to a respective storage compartment of the plurality of storage compartments and a closed position that prevents access to the respective storage compartment. The enclosure assembly includes at least one hidden hinge positioned within one or more storage compartments and coupled with a respective door of the plurality of doors to pivot the respective door between the open position and the closed position. In some cases, the enclosure assembly includes a plurality of door flanges each surrounding an opening for a respective storage compartment of the plurality of storage compartments, wherein at least a portion of the plurality of door flanges include: (i) a longitudinally-extending channel dimensioned to receive a mounting portion of the at least one hidden hinge; and (ii) a rim extending from the channel and configured to receive a seal.

According to a further aspect, this disclosure provides an enclosure assembly for a truck service body. The enclosure assembly includes an enclosure body comprising a left wall, a front wall, and a right wall formed from a single sheet of aluminum. The front wall defines a plurality of openings for accessing at least a portion of a plurality of storage compartments. There are a plurality of doors each movable between an open position that provides access to a respective storage compartment of the plurality of storage compartments and a closed position that prevents access to the respective storage compartment. The enclosure assembly includes at least one hidden hinge positioned within each storage compartment and coupled with a respective door of the plurality of doors to pivot the respective door between the open position and the closed position. In some cases, the enclosure assembly includes a plurality of rectangular-shaped door flanges each surrounding an opening for a respective storage compartment of the plurality of storage compartments. Depending on the circumstances, at least a portion of the plurality of door flanges include: (i) a longitudinally-extending channel dimensioned to receive a mounting portion of the at least one hidden hinge; and (ii) a rim extending from the channel and configured to receive a seal.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 2 is a front perspective view of an example service body according to an embodiment of this disclosure;

FIG. 3 is a rear perspective view of the example service body shown in FIG. 2;

FIG. 4 is a rear perspective cross-sectional view of the example service body shown in FIG. 3 along the line 4-4.

FIG. 5 is a side perspective cross-sectional view of the example service body shown in FIG. 3 along the line 5-5.

FIG. 6 is a rear perspective cross-sectional view showing a portion of the right storage compartment of the example service body shown in FIG. 2;

FIG. 7 is a detailed perspective cross-sectional view showing a hinged connection within the right storage compartment of the example service body shown in FIG. 2;

FIG. 8 is a detailed perspective cross-sectional view showing spacing between a door flange and door;

FIG. 9 is a rear perspective cross-sectional view showing a portion of the center storage compartment of the example service body shown in FIG. 2;

FIGS. 10-11 are top cross-sectional views showing the hinged connected with the door moving between an opening position and a closed position, respectively, according to an embodiment of the disclosure;

FIGS. 12-13 are perspective views of an example hinge that could be used in the service body according to an embodiment of the disclosure;

FIG. 14 is a rear perspective view of an example door flange that could surround one or more openings to storage compartments in the service body according to an embodiment of the disclosure;

FIG. 18 is a front view of a unitary sheet that has been laser-cut to form an external of the service body for a first side of a vehicle according to an embodiment of the disclosure;

FIG. 19 is a front view of a unitary sheet that has been laser-cut to form a fascia of the service body for a second side of a vehicle according to an embodiment of the disclosure;

DETAILED DESCRIPTION OF THE DRAWINGS

Figure 1:
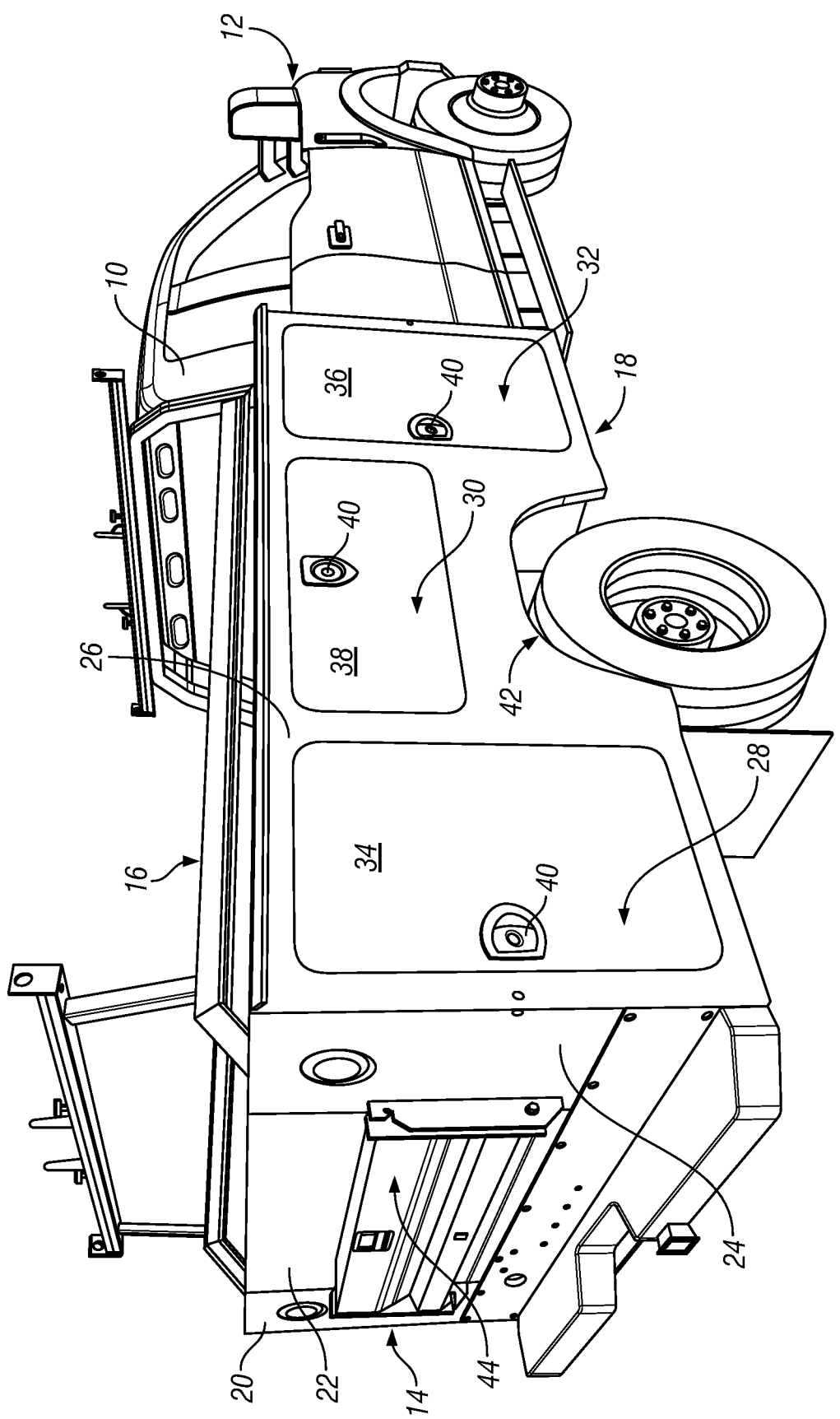
FIG. 1 is a perspective view of an example truck with a service body according to an embodiment of this disclosure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural features may be shown in specific arrangements. However, it should be appreciated that such specific arrangements may not be required. Rather, in some embodiments, such features may be arranged in a different manner than shown in the illustrative figures. Additionally, the inclusion of a structural in a particular figure is not meant to imply that such feature is required in all embodiments and, in some embodiments, may not be included or may be combined with other features.

This disclosure relates generally to a truck service body with one or more enclosure assemblies. FIG. 1 illustrates an example vehicle 10 with a front end 12, a rear end 14, a first side 16, and a second side 18. In the example shown, the vehicle 10 is embodied as a truck, but other embodiments may include other types of vehicles, such as a van, etc. As shown, the vehicle 10 includes a first side structure 20 with a first enclosure assembly 22 that defines a plurality of storage compartments (see FIG. 2). The vehicle 10 also includes a second side structure 24 with a second enclosure assembly 26 that defines a plurality of storage compartments.

As shown, the plurality of storage compartments comprises a left storage compartment 28, a center storage compartment 30, and a right storage compartment 32. In some cases, the left and right storage compartments 28, 32 have a left door 34 and right door 36, respectively, that pivot outwardly about a vertical axis. Depending on the circumstances, the center storage compartment 30 with a center door 38 that may pivot about a horizontal axis. Of course, in some cases one or more of the left door 34 and right door 36 may pivot about a horizontal axis and the center door 38 could pivot about a vertical axis. Although three storage compartments 28, 30, 32 are shown for purposes of example, more or less storage compartments could be provided depending on the circumstances. Likewise, the relative positions of each storage compartment could have a different arrangement depending on the circumstances. As shown, the doors 34, 36, 38 have radiused corners, but could be squared off or other shapes depending upon the circumstances.

In the embodiment shown, each of the doors 34, 36, 38 include a latch assembly 40 with a handle for opening and closing each respective door 34, 36, 38. Depending on the circumstances, some or all of the latch assemblies 40 may include a mechanical and/or electrical lock. As shown, the enclosure assemblies 22, 26 include a fender portion 42 to accommodate the wheel well of the vehicle 10.

Although the example includes two enclosure assemblies 22, 26, other embodiments are contemplated in which a single enclosure assembly could be provided. As shown, a bed 44 spaces apart the first enclosure assembly 22 and the second enclosure assembly 26.

Referring now to FIG. 2, there is shown an example enclosure assembly, which could be the first enclosure assembly 22 or the second enclosure assembly 26 shown in FIG. 1. As shown, the example enclosure assembly includes a left side 46, a right side 48, a top 50, and a bottom 52. In some embodiments, as discussed herein, a left wall 54, front wall 56, and right wall 58 may be formed from a single sheet of aluminum that is laser cut and formed (see FIGS. 18-19 and 24). As shown, the example enclosure assembly includes a top wall 60.

FIG. 3 illustrates the rear of the example enclosure assembly shown in FIG. 2. From this view, there is shown a rear wall 62 with an upper portion 64 that extends from the top wall between the left side 46 and the right side 48. As shown, on each side of the fender portion 42 is a shoulder 66 from which a lower portion 68 of the rear wall 62 extends. In some embodiments, as discussed herein, the top wall 60 and the upper portion of the rear wall 62 may be formed from a single sheet of aluminum that is formed into the shape shown (see FIGS. 20-23).

As shown, there is a left divider wall 70 extending between the left storage compartment 28 and the center storage compartment 30 between the bottom 52 and top 50 of the enclosure assembly. There is likewise a right divider wall 72 extending between the right storage compartment 32 in the center storage compartment 30 between the bottom 52 in the top 50 of the enclosure assembly (see FIG. 4). Of course, the arrangement of the storage compartments is shown for purposes of example only and other arrangements of the storage compartments could be provided.

Referring now to FIG. 4, there is shown a rear perspective view similar to FIG. 3, but with the rear wall 62 cut away to expose internal components within the storage compartments 28, 30, 32. As shown, the left door 34 pivots about a vertical axis about a first left hinge 74 and a second left hinge 76 generally along line 78. In this example, the left hinges 74, 76 are mounted to a left door flange 80, which surrounds an opening to the left storage compartment 28. As discussed herein, the hinges 74, 76 are mounted within a channel defined by the door flange 80.

As shown, the right door 36 pivots about a vertical axis about a first right hinge 82 and a second right hinge 84 generally along line 86. In this example, the right hinges 82, 84 are mounted to a right door flange 88, which surrounds an opening to the right storage compartment 32. As discussed herein, the hinges 82, 84 are mounted within a channel defined by the door flange 88.

In the embodiment shown, the center door 38 pivots about a horizontal axis with a first center hinge 90 and a second center hinge 92 generally along line 94. In this example, the center hinges 90, 92 are mounted to a center door flange 96, which surrounds an opening to the center storage compartment 30. As discussed herein, the hinges 90, 92 are mounted within a channel defined by the door flange 96.

Referring now to FIG. 5, there is shown a cutaway view to reveal the first left hinge 74 and second left hinge 76. In the embodiment shown, the door 34 comprises a door fascia 98 and a door panel 100. As shown, the door panel 100 includes a side wall 102 that spaces apart the panel 100 from the door fascia 98 and a mounting surface 104 for attaching the panel 100 to the door fascia 98. In the embodiment shown, the door fascia 98 is dimensioned to correspond with the opening to the storage compartment, which is the left storage compartment 28 in the example shown in FIG. 5. As shown, the door flange 80 is mounted inside the storage compartment 28 surrounding the opening to the compartment 28.

Figure 17:
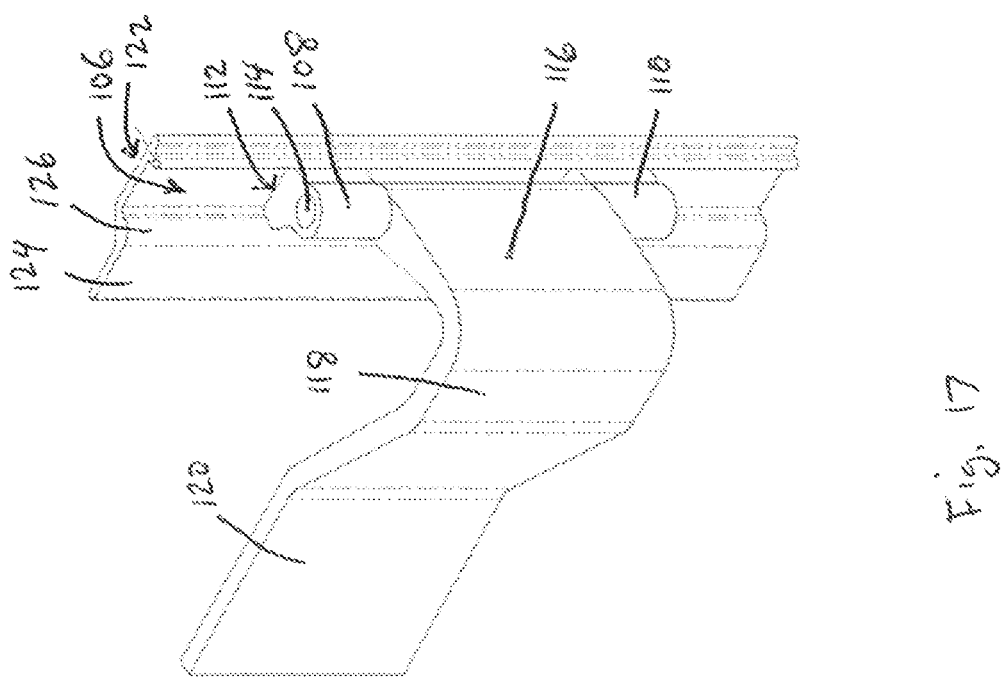
FIG. 17 is a front perspective view of an example hinge connected with a portion of a door hinge according to an embodiment of the disclosure.

In some embodiments, as described herein, the door flange 80 includes a channel 106 dimensioned to receive a mounting portion of the hinges 74, 76. For example, the mounting portion of the hinges 74, 76 may be welded to the channel 106 of the door flange 80. Referring also to FIGS. 12, 13, and 17, in some embodiments, each of the hinges 74, 76 may include a first mounting portion 108 and a second mounting portion 110. As shown, the mounting portions 108, 110 include a flat side 112 that abuts the channel 106 and each flat side 112 has a width sized to be received within the channel 106. The channel 106 aids in orienting the hinges 74, 76 when they are being installed within the storage compartment 28. As shown, the mounting portions 108, 110 include coaxial openings for receiving a pin 114 about which the hinge pivots.

The hinges 74, 76 have a proximal end 116 that includes an opening that is coaxial with the openings in the mounting portions 108, 110 so that the pin 114 extends therethrough. In this manner, the proximal end 116 pivots about pin 114. In the embodiment shown, the proximal end 116 includes an arcuate portion 118 that extends to a planar portion 120 that is attached to the door panel 100. Although this embodiment of hinges 74, 76 are described with respect to the left storage compartment 28, the other hinges 82, 84, 90, 94 may have a similar configuration with respect to the door flanges 88, 96 in the other storage compartments 30, 32. As shown, the door flange includes a mounting surface 122 that may be mounted within the storage compartment 28, such as by welding the mounting surface 122 to the interior surface of the storage compartment 128 surrounding the opening. Although this example shows two hinges for pivoting the left door 34, one or more hinges could be used depending on the circumstances.

In the embodiment shown, the door flange 80 includes a rim 124 that is configured to receive a seal, such as a press-on bulb seal (see FIGS. 10-11). As shown, the rim 124 extends from a transitional portion 126 that makes the rim 124 offset from the channel 106 (see FIGS. 15-16). In the embodiment shown, the rim 124 extends longitudinally in an approximately parallel plane as the longitudinal axis of the channel 106.

As shown, the rim 124 extends inwardly from the channel 106 into the opening of the storage compartment 28 to be adjacent with the perimeter of the door fascia 98. In this manner, the rim 124 may receive a seal (not shown) to seal the perimeter of the door 34 (see FIG. 11), and thereby prevent water from leaking into the storage compartment 28. In the embodiment shown, the rim 124 extends substantially in a plane that is parallel with the door fascia 98, but the rim is within the storage compartment 28 while the door 34 is flush with the front wall 56.

FIG. 6 is a detailed cross-sectional view of the right storage compartment 32 showing the connection between the second right hinge 84 and the right door 36. Similarly to the left hinges 74, 76, the second right hinge 84 includes mounting portions 108, 110 received within the channel 106 of the right door flange 88. The second right hinge 84 pivots about pin 114 on its proximal end 116 while the planar end 120 is attached with the door panel 100 of the right door 36. The rim 124 of the right door flange 88 extends into the opening of the right storage cabinet 32. This positions the rim 124 adjacent to the perimeter of the door fascia 98 of the right door 36, which allows the rim 124 to receive a seal (not shown) and thereby prevent water from entering the right storage compartment 32 when the right door 36 is closed. In the example shown, the right door flange 88 has an extension 128 that extends approximately perpendicular from the mounting surface 122 which allows the extension 128 to be attached with the right divider wall 72.

Referring now to FIGS. 7-8, there is shown a detailed cross-sectional view of the left storage compartment 28 to show the relative positioning of the door flange 80 with regard to the door 34 to illustrate the positioning of the door fascia 98 with regard to the rim 124 of the door flange 80. As can be seen in the embodiment shown, the door flange 80 is configured such that the rim 124 extends adjacent to the perimeter of the door fascia 98 so that when the rim 124 receives a seal (not shown), the seal is able to prevent water from entering into the storage compartment 28. As shown, there is an arcuate portion 130 of the rim 124 in the corner to receive the seal (not shown) in the radiused corners of the door fascia 98.

FIG. 9 shows a cross-sectional view of the center storage compartment 30. As shown, the hinge 92 is oriented to pivot about a horizontal axis. Similarly to the other storage compartments 28, 32, the center storage compartment 30 includes a door flange 96 with a rim 124 to receive a seal (not shown) for preventing leakage within the storage compartment 30. As with the other storage compartments 28, 32, the rim 124 is spaced apart from the perimeter of the door fascia 98 so that the seal (not shown) will prevent water from entering the storage compartment 30 when the door 38 is in the closed position.

FIGS. 10 and 11 are cross-sectional views showing the left door 34 pivoting between an open position and a closed position, respectively. As can be seen in these views, a press-on bulb seal 132 is coupled with the rim 124 of the door flange 80. In the open position shown in FIG. 10, the arcuate portion 118 of the hinge 74 is configured such that the hinge 74 clears the rim 124 of the door flange 80 while preventing the door fascia 98 from contacting the front wall 56. In the closed position shown in FIG. 11, the seal 132 prevents liquid from entering the storage compartment 28 through the area surrounding the door fascia 98. As can also be seen from the embodiment shown, the door fascia 98 is flush with the front wall 56 when the door 34 is in the closed position. As shown, the rim 124 is approximately parallel with the door fascia 98 when the door is in the closed position, which creates space for the seal 132.

Referring now to FIG. 14, there is shown an embodiment of the door flange 80. In the embodiment shown, the door flange 80 has a rectangular shape, but the shape could be square or other shapes based on the shape of the compartment to which the door flange will be associated. As shown, the door flange 80 includes a rim 124 that creates an inner periphery to which a seal may be attached. In this example, the rim 124 is configured for a door with radiused corners, and has an arcuate portion 130 with a curvature that corresponds with the radiused corners of the door. This allows a seal to be pressed on to the rim 124 to create a seal entirely surrounding the opening to the storage compartment.

Figure 15:
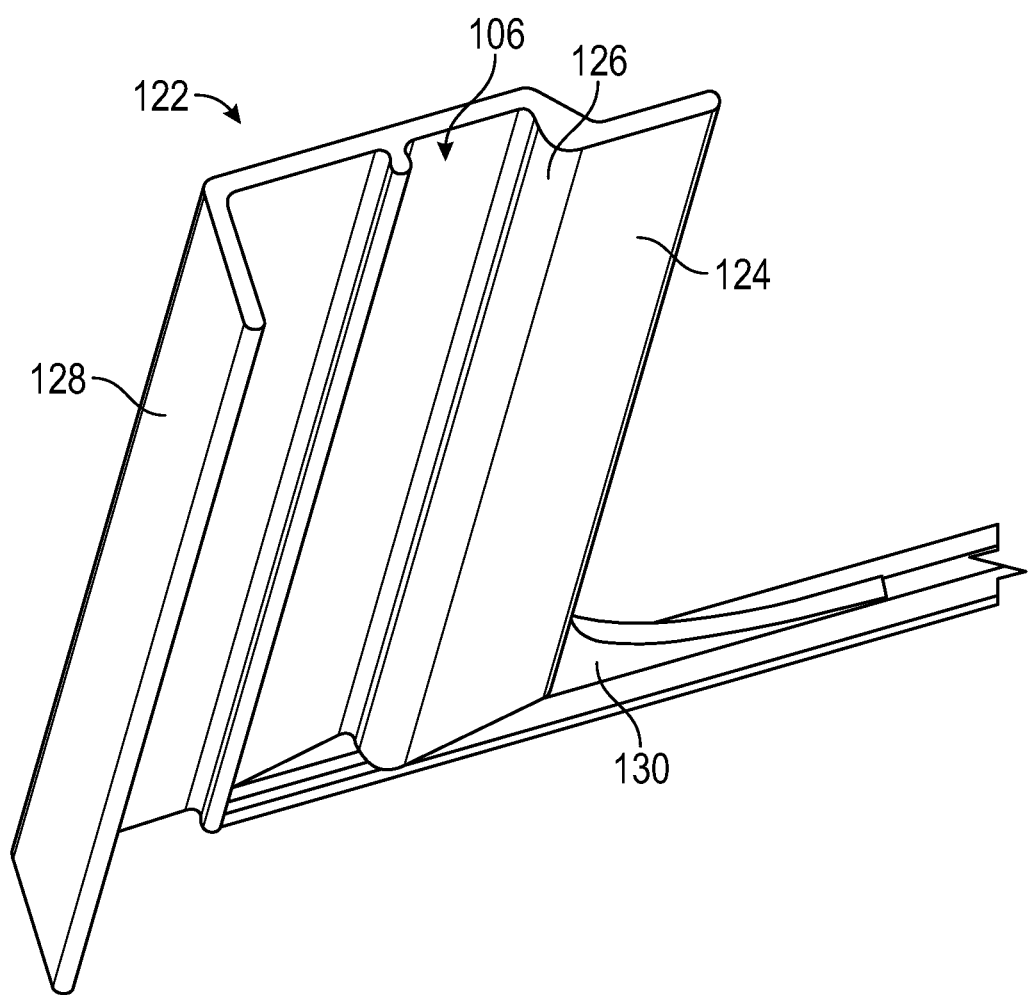
FIGS. 15-16 are cross-sectional views showing example profiles of the door flange shown in FIG. 14.
Figure 16:
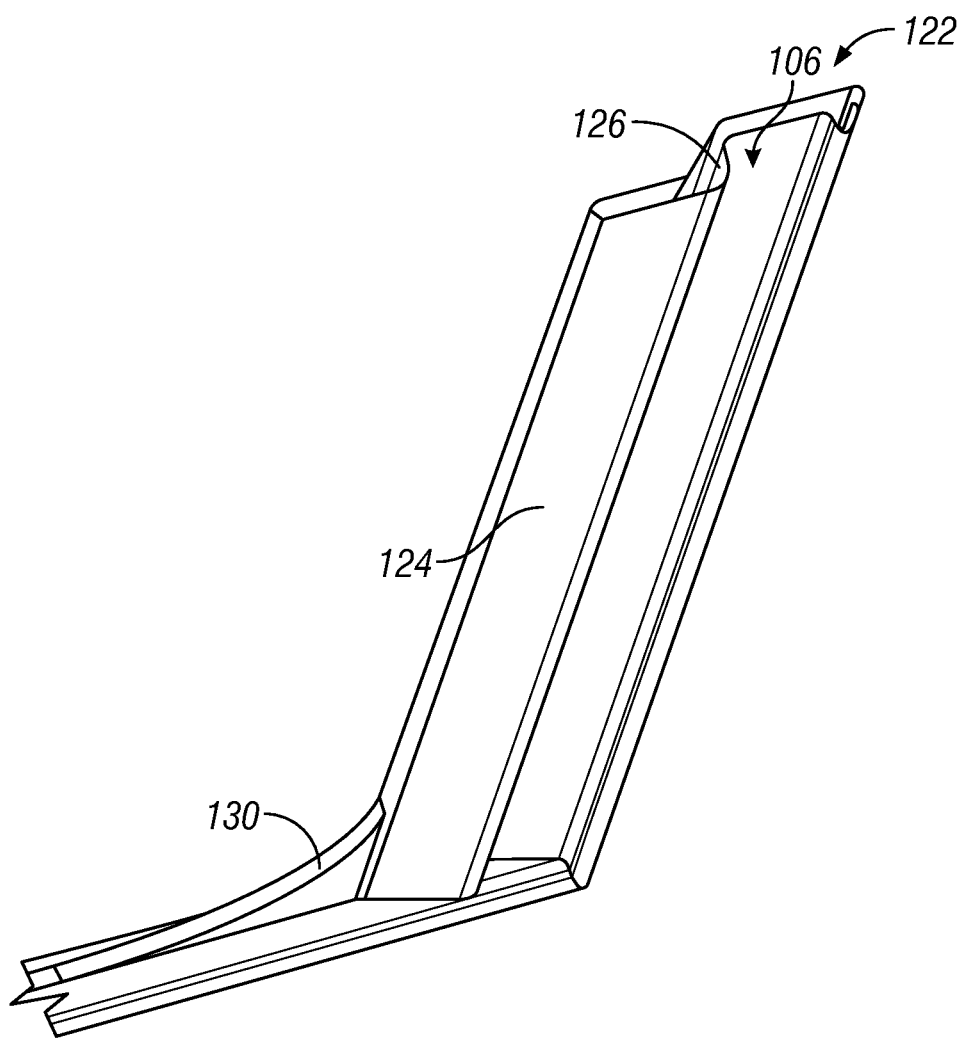

FIGS. 15 and 16 illustrate example profiles of the door flange 80, 88, 96 that could be used depending upon the circumstances. In some embodiments, a profile similar to that shown in FIG. 15 could be used on one side, such as the side with a divider wall, and the profile shown in FIG. 16 could be used on the other side. In some cases, the profile shown in FIG. 15 could be used on all sides; likewise, the profile shown in FIG. 16 could be used on all sides of the door flange 80, 88, 96. In the embodiment shown in FIG. 15, there is an extension 128 that is approximately perpendicular with the mounting surface 122 that is connected to the front wall 56. As shown, there is a channel 106 dimensioned to receive a mounting portion of the hinge. A rim portion 124 extends from the channel 106 to receive a seal that will surround the opening to the storage compartment.

In some embodiments, the left wall 54, front wall 56, and the right wall 58 may be formed from a single sheet. For example, the walls 54, 56, 58 may be formed from an aluminum sheet that is laser cut into the desired shape. FIGS. 18 and 19 show example embodiments of the sheet after being cut by a laser. For example, the sheet 134 shown in FIG. 18 could be used to form the left wall 54, front wall 56, and right wall 58 for the first enclosure assembly 22 while the sheet 136 shown in FIG. 19 could be used to form the left wall 54, front wall 56, and right wall 58 for the second enclosure assembly 26.

Figure 24:
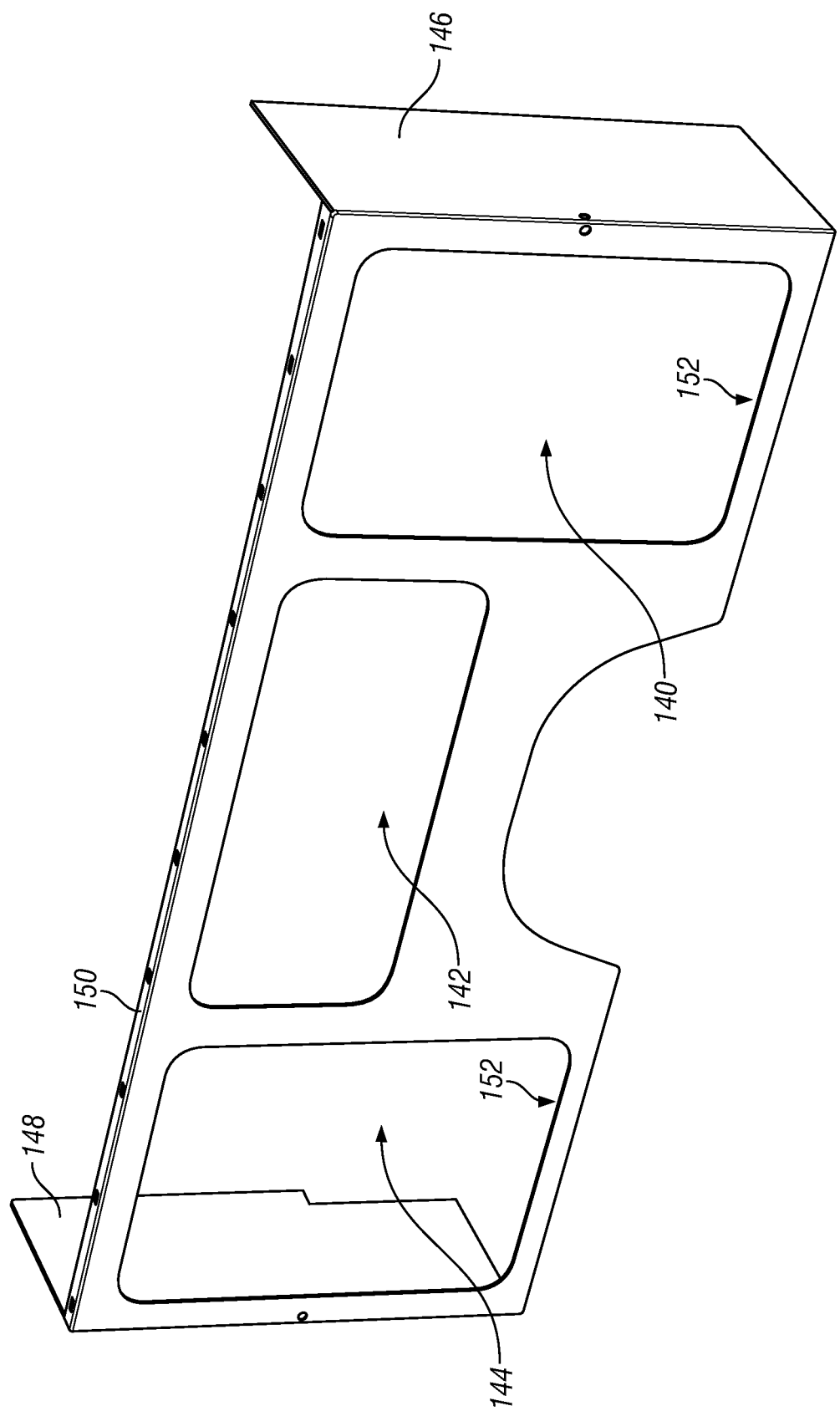
FIG. 24 is a perspective view of the example unitary sheet shown in FIG. 19 that has been formed into the front and side walls of the service body.

The example sheet 134 shown in FIG. 18 includes a center portion 138 with a left cut out 140 that is dimensioned for the left door 34, a center cut out 142 that is dimensioned for the center door 38, and a right cut out 144 that is dimensioned for the right door 36. As shown, a portion of the left cut out 140 has been further cut for use as the panel for the left door 34; a portion of the center cut out 142 has been further cut for use as a panel for the center door 38; and a portion of the right cut out 144 has been further cut for use as a panel for the right door 36. In the example shown, the sheet 134 includes a left tab 146 that may be bent approximately perpendicularly with respect to the center portion 138 to form the left wall 54; the sheet 134 also includes a right tab 148 that may be bent approximately perpendicularly with respect to the center portion 138 to form the right wall 58. As shown, the sheet 134 includes an upper tab 150 that may be bent approximately perpendicularly with respect to the center portion 138 to form a mounting portion for the top wall 60. In the embodiment shown, the sheet 134 also includes lower tabs 152 for mounting with a base wall or the truck bed 44. Referring now to FIG. 24, there is shown the sheet 134 after the tabs 146, 148, 150, 152 have been bent and the cut out portions 140, 142, 144 have been removed. Referring again to FIG. 19, the sheet 136 is essentially the same shape and has the same cutouts as the sheet 134, except that there are additional fuel cutouts 154.

Figure 21:
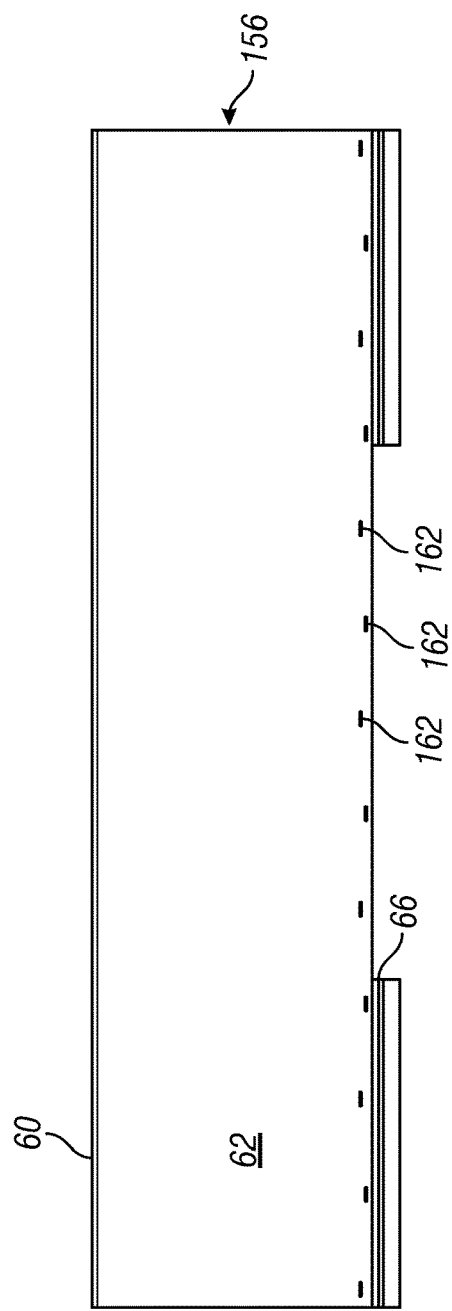
FIG. 21 is a front view of the unitary sheet shown in FIG. 20.
Figure 23:
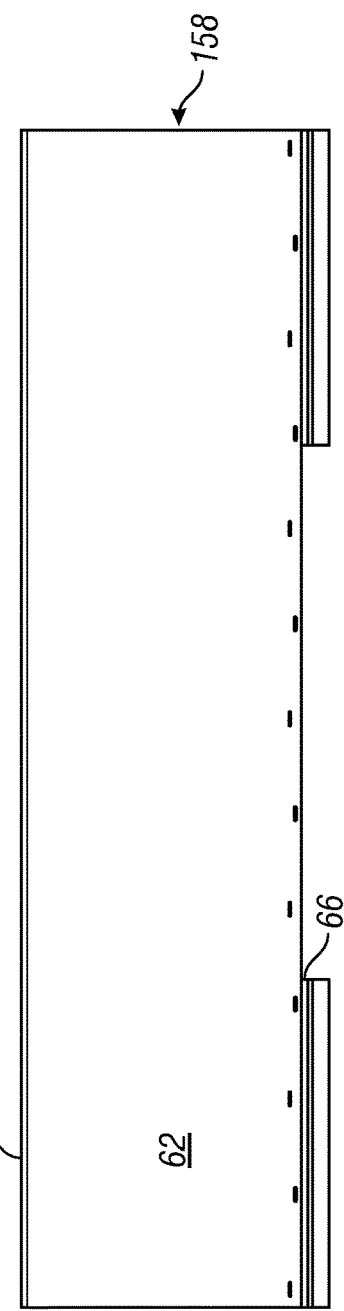
FIG. 23 is a front view of the unitary sheet shown in FIG. 22.
Figure 20:
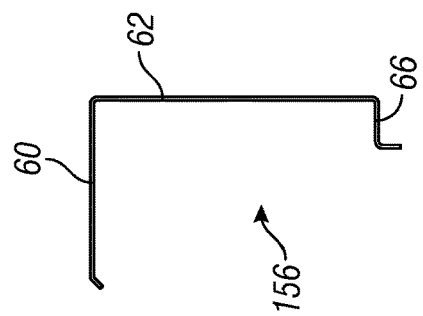
FIG. 20 is a left side view of a unitary sheet formed into the top and rear walls of the service body for the first side of the vehicle according of the disclosure.
Figure 22:
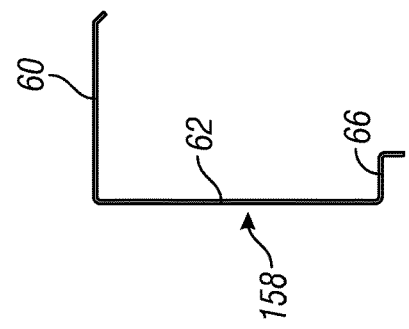
FIG. 22 is a left side view of a unitary sheet formed into the top and rear walls of the service body for the second side of the vehicle according of the disclosure.

FIGS. 20 and 21 show side and front views, respectively, of a sheet 156 that may be formed into the top wall 60 and at least a portion of the rear wall 62, such as the upper portion 64 of the rear wall 62. For example, the sheet 156 may be an aluminum sheet that is laser cut into the shape that may be formed as shown in FIGS. 20 and 21. FIGS. 22 and 23 show side and front views, respectively of a sheet 158 that may be formed into the top wall 60 and at least a portion of the rear wall 62, such as the upper portion 64 of the rear wall 62. For example, the sheet 156 may be used as the top wall 60 and rear wall 62 of the first enclosure assembly 22 and the sheet 156 may be used as the top wall 60 and rear wall 62 of the second enclosure assembly 26. As shown, the sheet 156 is configured to a driver side (which is the first side 16 in this example) of the vehicle 10 while the sheet 158 is configured to a passenger side (also called the second side 18 in this example) of the vehicle.

In some embodiments, the first enclosure assembly 22 and/or the second enclosure assembly 26 can be manufactured with the sheets 134, 136, 156, 158. For example, a single aluminum sheet may be laser cut into the shape shown as the sheet 134 or 146. The tabs 146, 148, 150, 152 may then be bent to form side walls 54, 58 and define a front wall 56. Similarly, a sheet of aluminum may be laser cut into the shape shown as sheet 156 or 158 and bent to form a top wall 60 and upper portion 64 of the rear wall 62. As shown, there are slots 160 formed in tab 150 that can be used for slot welding to the top wall 60. Likewise, there are slots 162 formed in sheets 156, 158, which can be used for slot welding the lower portion 68 of the rear wall 62. The hinges 74, 76, 82, 84, 90, 92 may be welded into channels 106 of door flanges 80, 88, 96. The channels 106 orient the hinges 74, 76, 82, 84, 90, 92 with respect to the doors 34, 36, 38. The door flanges 80, 88, 96 may be welded within respective storage compartments 28, 30, 32. The door panels 100 of the doors 34, 36, 38 may be welded to the planar portion 120 of respective hinges 74, 76, 82, 84, 90, 92.

Embodiments of the present disclosure provide a solution to the technical problem of water leakage into storage compartments. With existing service bodies, there are multiple sources of water leakage from punching rivets through the walls of the storage compartments to install hinges and other components. Accordingly, the present disclosure provides less source areas of water leakage by, in some embodiments, using door flanges with a rim that accepts a push-on bulb seal. In some embodiments, this also lowers the hinge cost and hinge assembly time.

Embodiments of the present disclosure provide a solution to the technical problem of manufacturing a service body. With existing service bodies, several members may be welded together and/or taped with double-sided tape, and these weld joints need to be grinded and primed during manufacture, which increases cost and assembly time. Accordingly, the present disclosure eliminates the cleaning and priming steps during manufacture by using a single sheet to create the exterior walls. In some embodiments, this also has the advantage of less welding due to sheet bends and slot welding. Depending on the circumstances, some storage compartments may be fully assembled on a bench with jigs.

Examples

Illustrative examples of the truck service body disclosed herein are provided below. An embodiment of the truck service body may include any one or more, and any combination of, the examples described below.

Example 1 is a truck body with a first side structure having a first enclosure assembly defining a plurality of storage compartments and a second side structure having a second enclosure assembly defining a plurality of storage compartments. The truck body includes a bed between the first side structure and the second side structure. The first enclosure assembly and/or the second enclosure assembly includes a plurality of doors each movable between an open position that provides access to a respective storage compartment of the plurality of storage compartments and a closed position that prevents access to the respective storage compartment. The enclosure assembly has at least one hidden hinge positioned within one or more of the storage compartments and coupled with a respective door of the plurality of doors to pivot the respective door between the open position and the closed position. There are a plurality of door flanges each surrounding an opening for a respective storage compartment of the plurality of storage compartments. In some cases, at least a portion of the plurality of door flanges include: (i) a longitudinally-extending channel dimensioned to receive a mounting portion of the at least one hidden hinge; and (ii) a rim configured to receive a seal.

Example 2 includes the subject matter of Example 1, and wherein a longitudinal axis of the rim extends along a substantially parallel plane as a longitudinal axis of the channel Example 3 includes the subject matter of Examples 1-2, and wherein the longitudinal axis of the rim extends along a plane that is laterally offset from the plane along which the longitudinal axis of the channel extends.

Example 4 includes the subject matter of Examples 1-3, and wherein the rim includes an arcuate portion with a curvature corresponding to a radiused corner of the respective door.

Example 5 includes the subject matter of Examples 1-4, and wherein the rim is spaced apart from a perimeter of the respective door and the seal received by the rim prevents water from penetrating the respective storage compartment.

Example 6 includes the subject matter of Examples 1-5, and wherein the rim extends longitudinally along substantially a parallel plane with a longitudinal axis of the respective door.

Example 7 includes the subject matter of Examples 1-6, and wherein a longitudinal axis of the rim extends along a substantially parallel plane as a longitudinal axis of the channel, but extends along a plane that is laterally offset from a plane along which the channel extends.

Example 8 includes the subject matter of Examples 1-7, and wherein the channel is mounted within the respective storage compartment.

Example 9 includes the subject matter of Examples 1-8, and wherein the seal comprises a push-on bulb seal mounted to the rim.

Example 10 includes the subject matter of Examples 1-9, and wherein the first enclosure assembly and/or the second enclosure assembly includes a left wall, a front wall, and a right wall formed from a single sheet of aluminum.

Example 11 includes the subject matter of Examples 1-10, and wherein the front wall defines openings for accessing each of the plurality of storage compartments.

Example 12 includes the subject matter of Examples 1-11, and wherein the plurality of storage compartments comprises a first storage compartment, a second storage compartment, and a third storage compartment, wherein second storage compartment is between the first storage compartment and the third storage compartment Example 13 includes the subject matter of Examples 1-12, and wherein doors corresponding to the first storage compartment and the third storage compartment pivot about a vertical axis and a door corresponding to the second storage compartment pivots about a horizontal axis.

Example 14 is an enclosure assembly for a truck service body. The enclosure assembly includes an enclosure assembly defining a plurality of storage compartments. There are a plurality of doors each movable between an open position that provides access to a respective storage compartment of the plurality of storage compartments and a closed position that prevents access to the respective storage compartment. The enclosure assembly includes at least one hidden hinge positioned within one or more storage compartments and coupled with a respective door of the plurality of doors to pivot the respective door between the open position and the closed position. In some cases, the enclosure assembly includes a plurality of door flanges each surrounding an opening for a respective storage compartment of the plurality of storage compartments, wherein at least a portion of the plurality of door flanges include: (i) a longitudinally-extending channel dimensioned to receive a mounting portion of the at least one hidden hinge; and (ii) a rim extending from the channel and configured to receive a seal.

Example 15 includes the subject matter of Example 14, and wherein a longitudinal axis of the rim extends along a substantially parallel plane as a longitudinal axis of the channel.

Example 16 includes the subject matter of Examples 14-15, and wherein the longitudinal axis of the rim extends along a plane that is laterally offset from the plane along which the longitudinal axis of the channel extends.

Example 17 includes the subject matter of Examples 14-16, and wherein the rim includes an arcuate portion corresponding to a radiused corner of the respective door and the seal extends substantially in an uninterrupted manner around the arcuate portion.

Example 18 includes the subject matter of Examples 14-17, and wherein the enclosure assembly includes a left wall, a front wall, and a right wall formed from a single sheet of aluminum, and wherein the front wall defines openings for accessing each of the plurality of storage compartments.

Example 19 includes the subject matter of Examples 14-18, and wherein the plurality of storage compartments comprises a first storage compartment, a second storage compartment, and a third storage compartment, wherein second storage compartment is between the first storage compartment and the third storage compartment, and wherein the doors corresponding to the first storage compartment and the third storage compartment pivot about a vertical axis and a door corresponding to the second storage compartment pivots about a horizontal axis.

Example 20 is an enclosure assembly for a truck service body. The enclosure assembly includes an enclosure body comprising a left wall, a front wall, and a right wall formed from a single sheet of aluminum. The front wall defines a plurality of openings for accessing at least a portion of a plurality of storage compartments. There are a plurality of doors each movable between an open position that provides access to a respective storage compartment of the plurality of storage compartments and a closed position that prevents access to the respective storage compartment. The enclosure assembly includes at least one hidden hinge positioned within each storage compartment and coupled with a respective door of the plurality of doors to pivot the respective door between the open position and the closed position. In some cases, the enclosure assembly includes a plurality of rectangular-shaped door flanges each surrounding an opening for a respective storage compartment of the plurality of storage compartments. Depending on the circumstances, at least a portion of the plurality of door flanges include: (i) a longitudinally-extending channel dimensioned to receive a mounting portion of the at least one hidden hinge; and (ii) a rim extending from the channel and configured to receive a seal.

The invention claimed is:

1. A truck body comprising:
    a first side structure comprising a first enclosure assembly defining a plurality of storage compartments;
    a second side structure comprising a second enclosure assembly defining a plurality of storage compartments;
    a bed between the first side structure and the second side structure;
    wherein the first enclosure assembly and/or the second enclosure assembly comprises:
        a plurality of doors each movable between an open position that provides access to a respective storage compartment of the plurality of storage compartments and a closed position that prevents access to the respective storage compartment;
        at least one hidden hinge positioned within one or more of the storage compartments and coupled with a respective door of the plurality of doors to pivot the respective door between the open position and the closed position;
        a plurality of door flanges each surrounding an opening for a respective storage compartment of the plurality of storage compartments, wherein at least a portion of the plurality of door flanges include: (i) a longitudinally-extending channel dimensioned to receive a mounting portion of the at least one hidden hinge; and (ii) a rim configured to receive a seal;
    wherein at least two hidden hinges are entirely positioned within one of the plurality of storage compartments;
    wherein each of the at least two hidden hinges include a planar portion mounted to a door of the plurality of doors and are pivotally attached to one or more mounting portions, wherein the one or more mounting portions include a flat side that abuts the longitudinally-extending channel; and
    wherein the one or more mounting portions of each of the at least two hidden hinges and the longitudinally-extending channel are coaxial with each other.

2. The truck body of claim 1, wherein a longitudinal axis of the rim extends along a substantially parallel plane as a longitudinal axis of the longitudinally-extending channel.

3. The truck body of claim 2, wherein the longitudinal axis of the rim extends along a plane that is laterally offset from the plane along which the longitudinal axis of the longitudinally-extending channel extends.

4. The truck body of claim 3, wherein the rim includes an arcuate portion with a curvature corresponding to a radiused corner of the respective door.

5. The truck body of claim 1, wherein the rim is spaced apart from a perimeter of the respective door and the seal received by the rim prevents water from penetrating the respective storage compartment.

6. The truck body of claim 1, wherein the rim extends longitudinally along substantially a parallel plane with a longitudinal axis of the respective door.

7. The truck body of claim 1, wherein a longitudinal axis of the rim extends along a substantially parallel plane as a longitudinal axis of the longitudinally-extending channel, but extends along a plane that is laterally offset from a plane along which the longitudinally-extending channel extends.

8. The truck body of claim 1, wherein the longitudinally-extending channel is mounted within the respective storage compartment.

9. The truck body of claim 1, wherein the seal comprises a push-on bulb seal mounted to the rim.

10. The truck body of claim 1, wherein the first enclosure assembly and/or the second enclosure assembly includes a left wall, a front wall, and a right wall formed from a single sheet of aluminum.

11. The truck body of claim 10, wherein the front wall defines openings for accessing each of the plurality of storage compartments.

12. The truck body of claim 11, wherein the plurality of storage compartments comprises a first storage compartment, a second storage compartment, and a third storage compartment, wherein second storage compartment is between the first storage compartment and the third storage compartment.

13. The truck body of claim 12, wherein doors corresponding to the first storage compartment and the third storage compartment pivot about a vertical axis and a door corresponding to the second storage compartment pivots about a horizontal axis.

14. An enclosure assembly for a truck service body, the enclosure assembly comprising:
    an enclosure assembly defining a plurality of storage compartments;
    a plurality of doors each movable between an open position that provides access to a respective storage compartment of the plurality of storage compartments and a closed position that prevents access to the respective storage compartment;
    at least one hidden hinge positioned within one or more storage compartments and coupled with a respective door of the plurality of doors to pivot the respective door between the open position and the closed position;
    a plurality of door flanges each surrounding an opening for a respective storage compartment of the plurality of storage compartments, wherein at least a portion of the plurality of door flanges include: (i) a channel dimensioned to receive a mounting portion of the at least one hidden hinge; and (ii) a rim extending from the channel and configured to receive a seal;
    wherein at least two hidden hinges are entirely positioned within one of the plurality of storage compartments;

wherein each of the at least two hidden hinges include a planar portion mounted to a door of the plurality of doors and are pivotally attached to one or more mounting portions, wherein the one or more mounting portions include a flat side that abuts the longitudinally-extending channel; and wherein the one or more mounting portions of each of the at least two hidden hinges and the longitudinally-extending channel are coaxial with each other.

15. The enclosure assembly of claim 14, wherein a longitudinal axis of the rim extends along a substantially parallel plane as a longitudinal axis of the channel.

16. The enclosure assembly of claim 15, wherein the longitudinal axis of the rim extends along a plane that is laterally offset from the plane along which the longitudinal axis of the channel extends.

17. The enclosure assembly of claim 16, wherein the rim includes an arcuate portion corresponding to a radiused corner of the respective door and the seal extends substantially in an uninterrupted manner around the arcuate portion.

18. The enclosure assembly of claim 14, wherein the enclosure assembly includes a left wall, a front wall, and a right wall formed from a single sheet of aluminum, and wherein the front wall defines openings for accessing each of the plurality of storage compartments.

19. The enclosure assembly of claim 18, wherein the plurality of storage compartments comprises a first storage compartment, a second storage compartment, and a third storage compartment, wherein second storage compartment is between the first storage compartment and the third storage compartment, and wherein doors corresponding to the first storage compartment and the third storage compartment pivot about a vertical axis and a door corresponding to the second storage compartment pivots about a horizontal axis.

20. An enclosure assembly for a truck service body, the enclosure assembly comprising:

an enclosure body comprising a left wall, a front wall, and a right wall formed from a single sheet of aluminum, and wherein the front wall defines a plurality of openings for accessing at least a portion of a plurality of storage compartments;

a plurality of doors each movable between an open position that provides access to a respective storage compartment of the plurality of storage compartments and a closed position that prevents access to the respective storage compartment;

at least one hidden hinge positioned within each storage compartment and coupled with a respective door of the plurality of doors to pivot the respective door between the open position and the closed position;

a flange comprising four legs arranged as a rectangle, wherein each of the four legs includes:
   a top surface comprising: (i) a mounting surface attached to a front wall surrounding an opening of a respective storage compartment of the plurality of storage compartments and (ii) a rim configured to receive a seal surrounding the opening for the respective storage compartment of the plurality of storage compartments; and
   an opposing bottom surface comprising a longitudinally-extending channel dimensioned to receive one or more mounting portions of at least two hidden hinges wherein at least two hidden hinges are mounted to at least one leg of the flange in the longitudinally-extending channel, wherein the at least two hidden hinges are entirely positioned within one of the plurality of storage compartments;

wherein each of the at least two hidden hinges include a planar portion mounted to a door of the plurality of doors and are pivotally attached to the one or more mounting portions, wherein the one or more mounting portions include a flat side that abuts the longitudinally-extending channel; and wherein the one or more mounting portions of each of the at least two hidden hinges and the longitudinally-extending channel are coaxial with each other.

* * * * *